United States Patent [19]

Tadauchi

[11] Patent Number: 4,931,875
[45] Date of Patent: Jun. 5, 1990

[54] IMAGE RECORDING SYSTEM CAPABLE OF FORMING IMAGE AREA BY AREA

[75] Inventor: Yukio Tadauchi, Osaka, Japan

[73] Assignee: Minolta Camera Kabushiki Kaisha, Osaka, Japan

[21] Appl. No.: 337,097

[22] Filed: Apr. 12, 1989

[30] Foreign Application Priority Data

Apr. 14, 1988 [JP] Japan .................. 63-93229

[51] Int. Cl.$^5$ .............. H04N 1/29; H04N 1/46; G01D 15/06; G03G 15/01
[52] U.S. Cl. .................. 358/300; 346/157
[58] Field of Search .......... 358/296, 300, 75; 346/153.1, 157; 355/24, 32, 326; 364/518

[56] References Cited

U.S. PATENT DOCUMENTS

| | | |
|---|---|---|
| 3,572,288 | 3/1971 | Turner . |
| 3,914,043 | 10/1975 | McVeigh .............. 355/326 |
| 3,960,445 | 6/1976 | Drawe ................. 355/326 |
| 3,967,891 | 7/1976 | Rippstein . |
| 4,099,860 | 7/1978 | Connin . |
| 4,256,400 | 3/1981 | Komori et al. . |
| 4,275,958 | 6/1981 | Tachika et al. .......... 355/326 |
| 4,336,994 | 6/1982 | Banton ................ 355/327 |
| 4,572,102 | 2/1986 | Yuge et al. . |
| 4,579,443 | 4/1986 | Abuyama et al. ......... 355/326 |
| 4,582,417 | 4/1986 | Yagasaki et al. . |
| 4,587,568 | 5/1986 | Takayama et al. . |
| 4,627,707 | 12/1986 | Tani et al. . |
| 4,655,580 | 4/1987 | Watanabe et al. . |
| 4,657,376 | 4/1987 | Ide . |
| 4,668,978 | 5/1987 | Gokita ................ 355/326 |
| 4,720,730 | 1/1988 | Ito . |
| 4,723,148 | 2/1988 | Hamakawa . |
| 4,731,637 | 3/1988 | Acquaviva et al. ........ 355/24 |
| 4,743,946 | 5/1988 | Nishimori et al. . |
| 4,745,437 | 5/1988 | Oka et al. ............. 355/266 |
| 4,772,921 | 9/1988 | Ito . |

FOREIGN PATENT DOCUMENTS

| | | |
|---|---|---|
| 3705511 A1 | 9/1987 | Fed. Rep. of Germany . |
| 48-22212 | 7/1973 | Japan . |
| 51-134635 | 11/1976 | Japan . |
| 54-30833 | 3/1979 | Japan . |
| 60-170868 | 9/1985 | Japan . |
| 60-194469 | 10/1985 | Japan . |
| 60-212778 | 10/1985 | Japan . |
| 61-72270 | 4/1986 | Japan . |
| 61-203474 | 9/1986 | Japan . |
| 62-61464 | 3/1987 | Japan . |
| 62-90186 | 6/1987 | Japan . |
| 62-59504 | 12/1987 | Japan . |

Primary Examiner—Bruce A. Reynolds
Assistant Examiner—Scott A. Rogers
Attorney, Agent, or Firm—Burns, Doane, Swecker & Mathis

[57] ABSTRACT

An image recording system including a host control unit for generating image data and a printer apparatus for forming an image on a sheet of paper in accordance with the image data generated form the host control unit. The printer apparatus has a function of dividing the image into at least two image areas with respect to a boundary and of forming each of the image areas in different colors. The host control unit is adapted to apply to said printer apparatus a boundary signal indicative of the boundary of at least two image areas which are to be formed in different colors. The printer apparatus has a designating device for designating one of the image areas as an image to be formed, and a prohibiting device for prohibiting formation of the image area other than the image area designated.

7 Claims, 21 Drawing Sheets

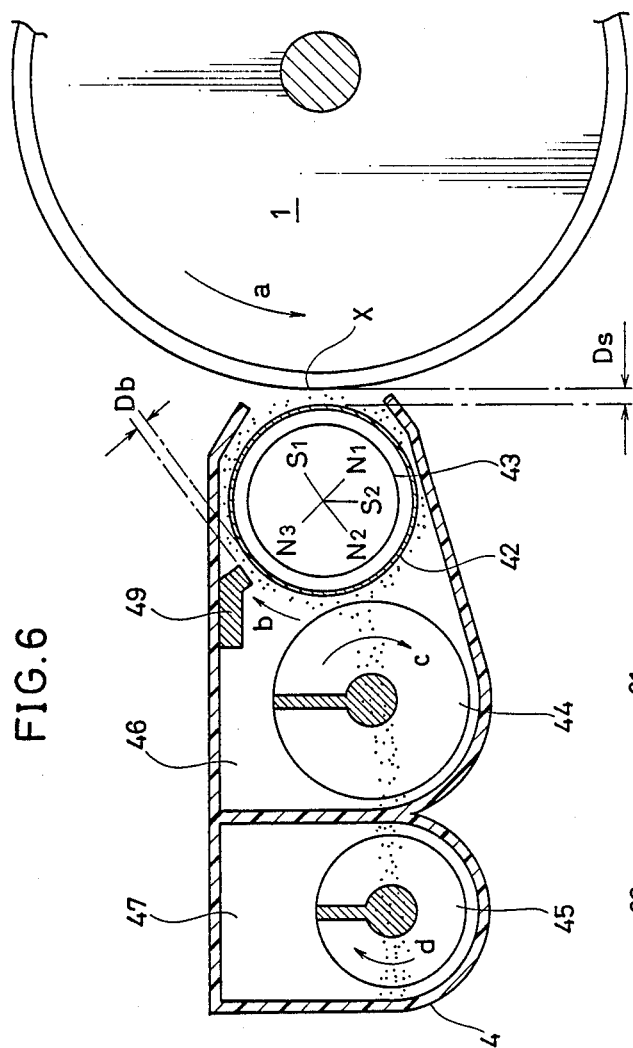
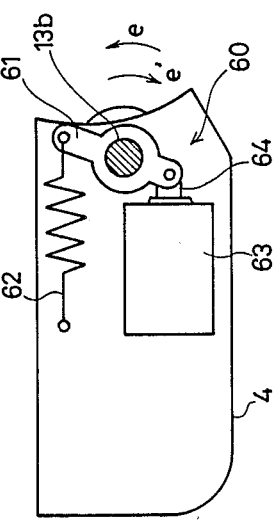
FIG. 6
FIG. 7

IMAGE RECORDING SYSTEM CAPABLE OF FORMING IMAGE AREA BY AREA

CROSS REFERENCE TO RELATED COPENDING APPLICATIONS

Related copending applications of particular interest to the present invention are U.S. Ser. No. 148,423 entitled "Multi-Color Image Forming Apparatus", filed on Jan. 25, 1988, and U.S. Ser. No. 242,419 entitled "Image Recording System", filed on Sept. 9, 1988.

BACKGROUND OF THE INVENTION

Field of the Invention

The present invention relates to an image recording system and, more specifically, to an image recording system capable of operating in a mode in which an image to be recorded is divided into a plurality of image areas and the respective areas are formed with different colors and in a mode in which only one of the areas is formed.

Description of the Related Art

A printer connected to a host machine such as a word processor, a personal computer for business use and the like for printing various data such as letters, characters and images as hard copies has come to be provided with a function of color printing, as the host machine has come to have various function and various manners of printing such as color printing have been desired.

Japanese Patent Laying-Open Gazette No. 203474/1986 discloses a copying machine capable of providing a multicolor copy by one copying operation by switching and driving a plurality of developing units containing developers of different colors. In this machine, the areas which are to be developed by respective developing units are designated by inputting coordinates on an operating panel, visually checking the original.

Multicolor printing of 1 page can be also provided by a printer.

Now, a printer is very frequently used for printing a text which have been formed previously as well as a text which is newly formed in a host machine.

In that case, if a specified area only is to be printed with the original text kept as it is, the text must be formed again for the desired data to be printed.

SUMMARY OF THE INVENTION

An object of the present invention is to facilitate operation of an image recording system capable of printing image of 1 page with the images divided into a plurality of image areas.

Another object of the present invention is to provide a desired image area only, in an image recording system capable of printing image of 1 page with the image divided into a plurality of image areas.

A further object of the present invention is to provide only a desired image area with a desired color, in an image recording system capable of printing image of 1 page with the image divided into a plurality of image areas.

The above described objects of the present invention can be attained by an image recording system, which is, in a broad sense, an image recording system comprising a host control unit for generating image data and a printer apparatus for forming an image on a sheet of paper in accordance with the image data generated from the host control unit, the printer apparatus having a function of dividing the image into at least two image areas with respect to one boundary and of forming each of the image areas with different colors, the host control unit adapted to supply to the printer apparatus a boundary signal indicative of the boundary of the said at least two image areas which are to be formed with different colors, the printer apparatus including designating means and prohibiting means. The designating means designates either one of the image areas as an image to be formed. The prohibiting means prohibits formation of the image area other than the image area designated by the designating means.

Since the image recording system structured as described above forms only the designated image area, there is no need of setting new image data, which is very convenient.

The foregoing and other objects, features, aspects and advantages of the present invention will become more apparent from the following detailed description of the present invention when taken in conjunction with the accompanying drawings.

BRIEF DESCRIPTION OF THE DRAWINGS

Fig. 6 is a cross sectional view showing the developing unit of FIG. 2 which is not operating;

FIG. 7 shows the operational mechanism of the magnet roller 43 shown in FIG. 6;

DESCRIPTION OF THE PREFERRED EMBODIMENTS

Figure 1:
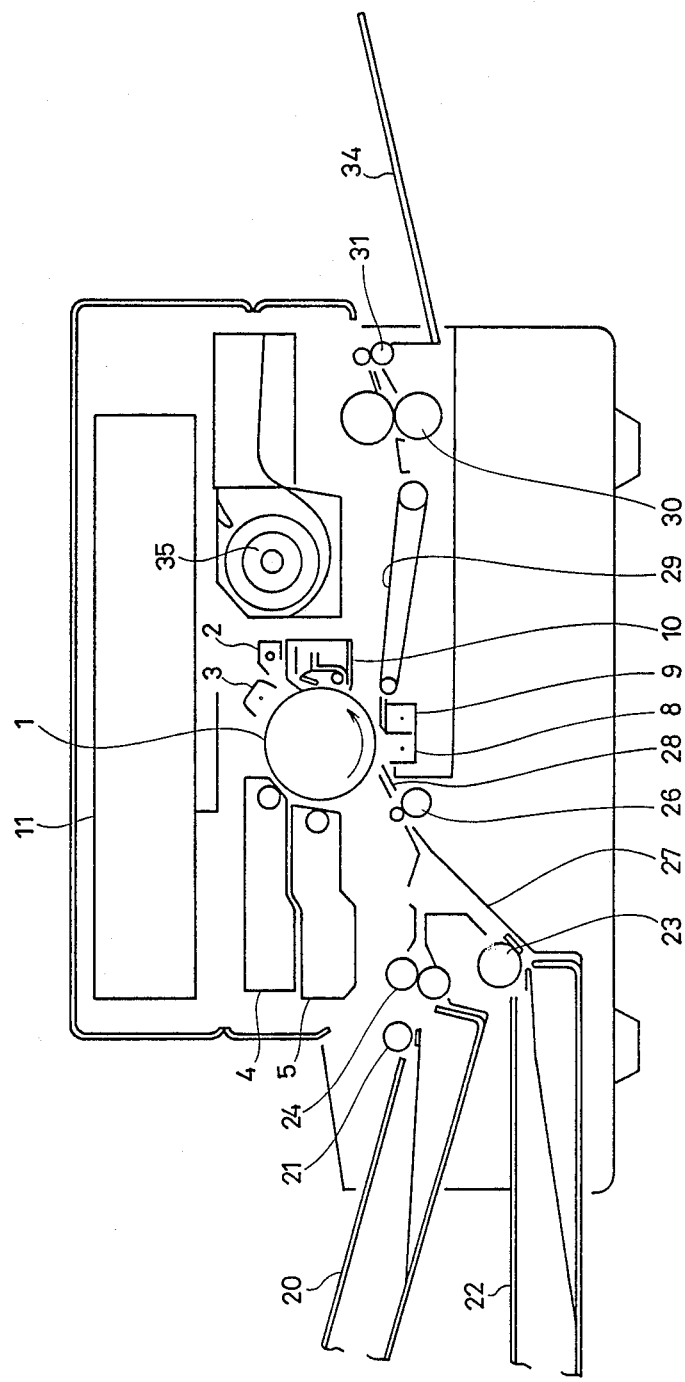
FIG. 1 is a schematic cross sectional view showing a structure of a printer in accordance with one embodiment of the present invention.

FIG. 1 is a schematic cross sectional view showing a structure of a printer in accordance with one embodiment of the present invention.

A photoreceptor drum 1 which can be rotary driven in a counter clockwise direction is provided approximately at the center of a printer body. A main eraser lamp 2, a corona charger 3, a first developing unit 4, a second developing unit 5, a transfer charger 8, a separation charger 9 for separating copy papers, a blade type cleaner apparatus 10 and so on are arranged in this order around the photoreceptor drum 1. A photosensitive layer is provided on the surface of the photoreceptor drum 1, and it is irradiated by the eraser lamp 2 at every rotation and is charged by the corona charger 3. The charged photoreceptor drum 1 is exposed by a laser beam emitted from a laser optical unit 11.

Upper and lower paper feeding portions respectively comprising paper feeding rollers 21 and 23 are mounted on the left side of the printer body, to which a first cassette 20 and a second cassette 22 are attached, respectively. A roller pair 24, a timing roller pair 26, guiding plates 27 and 28, a conveyer belt, 29, a fixing roller pair 30 and a discharging roller pair 31 constitute a conveying path of the copy papers contained in the cassettes 20 and 22.

The laser beam is on/off modulated corresponding to the image data from the host machine, irradiated on the photoreceptor drum 1 and forms latent electrostatic images on the drum 1. Toners contained in the first and second developing units 4 and 5 are applied to the latent electrostatic images by selectively driving the first and second developing units 4 and 5. The toner images on the photoreceptor drum 1 are a transferred by the transfer charger 8 to a sheet of paper fed from the timing roller pair 26 in synchronization with the toner image forming region. The sheet is separated from the surface of the photoreceptor drum 1 by the separating charger 9 and is fed to the fixing roller pair 30 by the conveyer belt 29. The toner is heat fixed therein, and the sheet is fed to the charging tray 34 by the discharging roller pair 31. An exhaust fan is provided to prevent increase of temperature in the copying machine caused by the heat from the fixing roller pair and the like. The photoreceptor drum 1, the paper feeding rollers 21 and 23, the roller pair 24, the timing roller pair 26, the first and second developing units 4 and 5, the conveyor belt 29, the fixing roller pair 30, the discharging roller pair 31 and so on are adapted to be driven by a main motor, not shown. The paper feeding rollers 21 and 23, the timing roller pair 26, the roller pair 24, the first and second developing units 4 and 5 and so on are adapted to be selectively connected to the main motor by means of a solenoid, a magnetic spring clutch or the like (not shown), so that each of these component can operate independently.

FIGS. 2 to 7 illustrate the structure of the developing units employed in the copying machine of FIG. 1 and the switch driving thereof.

Figures 4, 5:
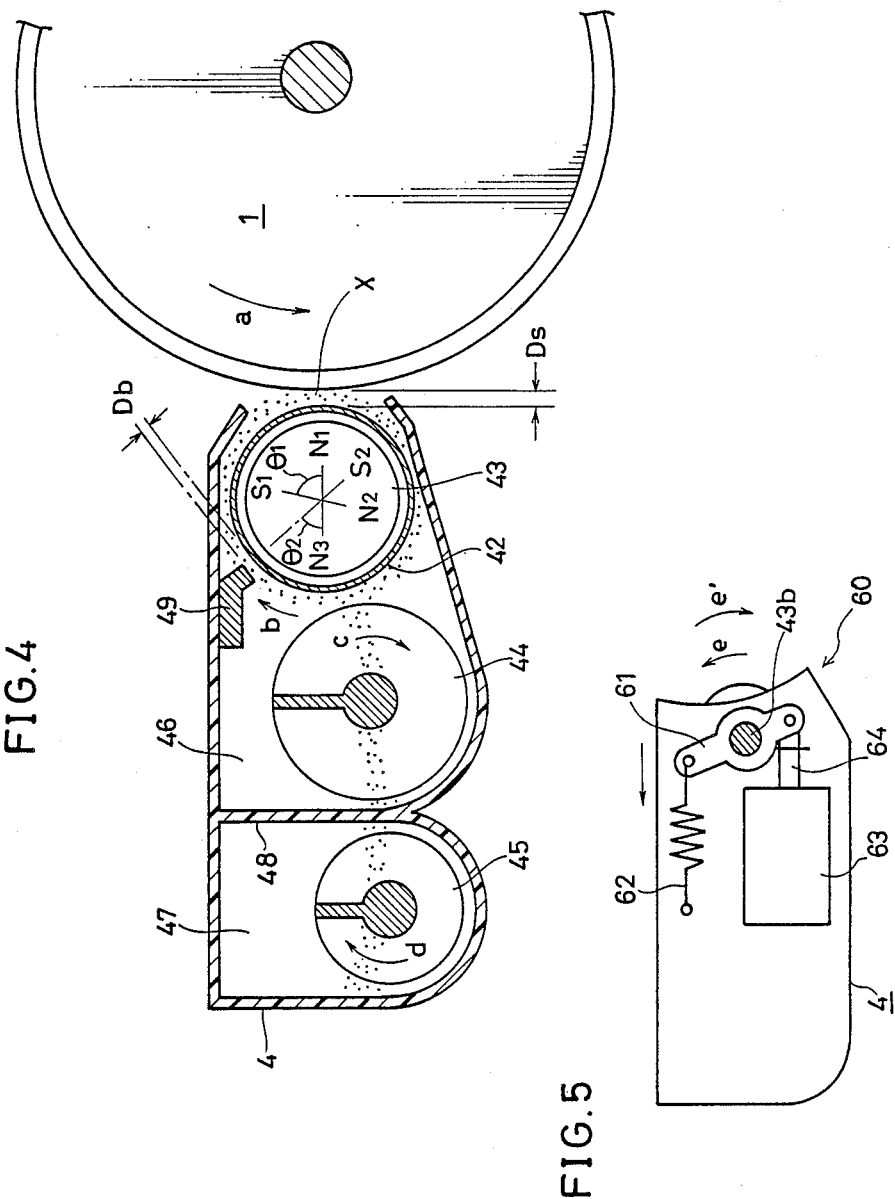
FIG. 4 is a cross sectional view showing the developing unit of FIG. 2 during developing operation.
FIG. 5 shows the operational mechanism of the magnet roller 43 shown in FIG. 4.

Since the developing units 4 and 5 have approximately the same structure as shown in FIG. 4, detailed description will be given only of the developing unit 4. In a developer tank 41, a developing sleeve 42, a supply roller 44 and a screw 45 are arranged in this order from the side of the photoreceptor drum 1.

The developing sleeve 42 is a cylinder ($\phi$24.5 mm) formed of a non-magnetic conductive material whose outer surface made rough by sand blasting. The developing sleeve 42 is opposed to the photoreceptor drum 1 at a developing position X with a developing gap: Ds (=0.6 mm) provided therebetween, and the angle of rotation from the exposure point W to the developing point X is set at $\alpha$.

On the rear side of the portion opposing to the developing position X of the developing sleeve 42, there is provided a regulating member 49 formed on the upper portion of the inner surface of the developer tank 41 with a regulating gap: Db (=0.4 mm) provided therebetween. The regulating member 49 regulates the height of toner applied on the developing sleeve 42.

A magnet roller 43 is provided in the developing sleeve 42. The magnetic power of the magnetic pole N1 to N3, S1 and S2 positioned on the outer periphery are N1=1000G, N2, N3=500G, and S1, S2=800G (G is an abbreviation of gauss), respectively.

The center of the magnetic pole N1 is placed at a position which is spaced apart from the center of the magnetic pole S1 by $\theta_1$ (80°) in the clockwise direction. The center of the magnetic pole N3 is placed at a position spaced apart from the portion opposing to the regulating member 49 by $\theta_2$ )40°) in the counter clockwise direction, with the magnetic pole N1 opposing to the photoreceptor drum 1, as shown in FIG. 4.

A support axis 43a of the magnet roller 43 has its one end portion 43a supported by a concave portion 42c of a bearing provided in the developing sleeve 42 and the other end portion 43b supported by a sidewall of the developing tank 42. The magnet roller 43 can be turned by a prescribed angle ($\theta_1$=40°) by moving means 60 which will be described in detail in the following.

Figure 3:
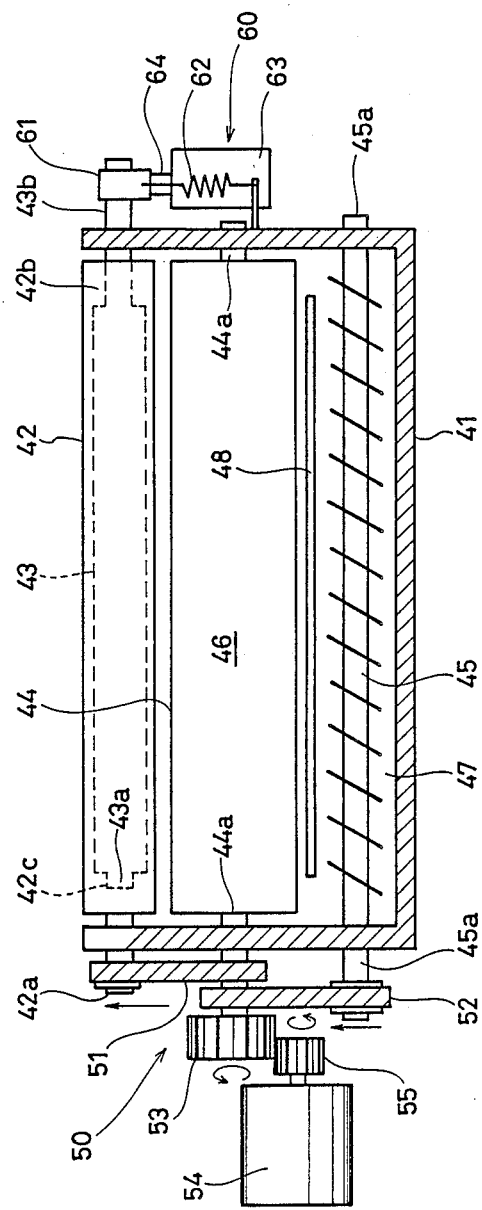
FIG. 3 is a schematic cross sectional view showing a structure of the developing unit of FIG. 2.

Meanwhile, the developing sleeve 42 has its bearing portion 42b in the right side as viewed in FIG. 3 supported by the support axis 43b of the magnet roller 43 and its support axis 42a on the opposite side supported by the sidewall of the developing tank 41. The developing sleeve 42 can be rotary driven by driving means 50.

A supply roller 44 and a screw 45 are respectively provided in conveying paths 46 and 47 which are separated from each other by a partition 48. These rollers 44 and 45 have their support axes 44a and 45a supported by the sidewalls of the developing tank 41 and the rollers are driven by the driving means 50.

The conveyer paths 46 and 47 communicate with each other on both sides of the developing tank 41 (between the partition 48 and the sidewall of the developing tank 41) as shown in FIG. 3.

As shown in FIG. 3, a belt 51 is wound around the support axis 42a of the developing sleeve 42 and the support axis 44a of the supply roller 44. A belt 52 is wound around the support axis 44a of the supply roller 44 and the support axis 45 of the screw 45.

A gear 53 is attached to an end portion of the support axis 44a of the supply roller 44, which gear being engaged with a driving gear 55 of a motor 54.

Therefore, when the driving gear 55 is rotated in the direction of the solid line in FIG. 3 by driving the motor 54, the gear 53 and the belts 51 and 52 are driven in the direction of the solid line, respectively. Consequently, the developing sleeve 42, the supply roller 44 and the screw 45 are rotated in the direction of the arrows b, c and d, respectively (see FIG. 2). In this embodiment, the developing sleeve 42 is adapted to rotate at a speed of 240 rpm.

The moving means 60 for the magnet roller 43 comprises a lever 61, a spring 62 and a solenoid 63, as shown in FIGS. 5 and 7. The lever 61 is fixed to an end portion of the support axis 43b of the magnet roller 43 and one end of the spring 62 fixed to the developing tank 41 is fixed thereto, always being biased in the direction of the arrow e. A plunger 64 of the solenoid 63 is engaged with the other end side of the lever 61, and when the solenoid 63 is driven, it rotates the lever 61 in the direction of the arrow e' against the biasing power of the spring 62.

When the solenoid 63 is not operating, that is, when the lever 61 is in the state of FIG. 5, the magnetic pole N1 of the magnet roller 43 is opposed to the photoreceptor drum 1 and the magnetic pole N3 is positioned spaced apart from the position opposing to the regulating member 49 by $\theta_2$ (40°) in the counterclockwise direction.

On the contrary, when the solenoid 63 is driven and the lever 61 is in the state shown in FIG. 7, the magnet roller 43 rotates such that the magnetic pole N3 is opposed to the regulating member 49 and a portion between the magnetic poles N1 and S1 is opposed to the photoreceptor drum 1, as shown in FIG. 6.

The toner is applied to the photoreceptor drum 1 from the developing unit 4 in the state shown in FIG. 4, while the toner is not applied to the photoreceptor drum 1 from the developer unit 4 in the state shown in FIG. 6. Namely, in the state of FIG. 6, an intermediate portion between the N and S magnetic poles is opposed to the photoreceptor drum 1, that is, a portion of the developing sleeve 42 on which there is no toner is opposed to the photoreceptor drum 1.

In a printer having the above described structure, toners of different colors can be applied to different image forming areas by switching and driving developing apparatuses corresponding to prescribed image forming areas with prescribed timing.

Operating modes of the printer in this embodiment will be described in the following. First, the printer can be operated in a normal print mode in which either a first or second developing unit only is used for developing all the images on 1 page. The normal print mode includes a black mode in which only the first developing unit is used and a color mode in which only the second developing unit is used. The printer can be also operated in an edition print mode in which images on 1 page are developed in two colors or only some portions of the images on 1 page are developed by switching the developing units during developing the images on 1 page. The edition print mode includes a black-color mode in which the developing units are switched from the first one to the second one or from the second one to the first one during forming images on 1 page, a black-null mode in which only some portions of the images on 1 page are developed by the first developing unit, and a color-null mode in which only some portions of the images on 1 page are developed by the second developing unit. For example, when a text having "questions" written in the upper half and "answers" written in the lower half with respect to a boundary BD is formed by a host machine, the printer prints the upper portion in black (color) and the lower portion in color (black) in the black-color mode. In the black-null mode, either the upper or lower portion is printed in black. In the color-null mode, only the upper or lower portion is printed in color.

Figure 8:
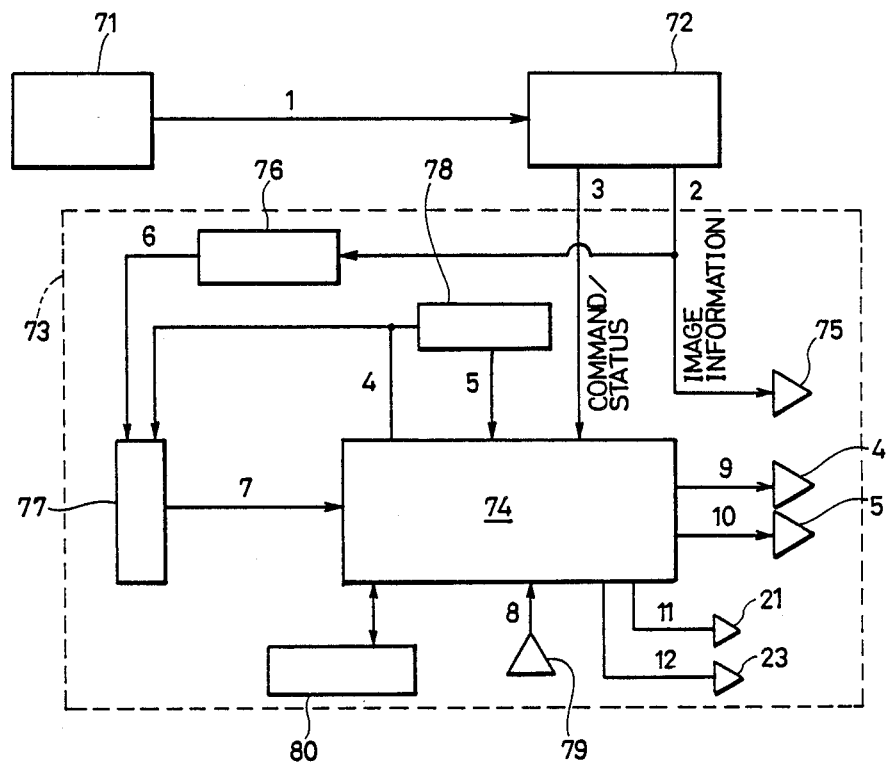
FIG. 8 is a block diagram showing the exchange of image data, control information and so on between each of a host machine, a controller and a printer engine in accordance with one embodiment of the present invention.

FIG. 8 is a block diagram showing the exchange of image data and control data between each of a host machine 71, a controller 72 and a printer engine 73.

The print data transmitted from the host machine 71 through a bus①comprise image data and control data. Receiving the print data, the controller 72 forms a bit map from the image data and transmits the same to a laser driving portion 75 of the printer engine 73 through a bus②. The control data are transmitted to the printer engine 73 as state information through a bus③. The CPU 74 of the printer engine 73 which receives respective information through the bus③controls switching and driving of the first and second developing units through buses⑨and ⑩. A line counter 77 which counts the number of lines in accordance with the information from a determining circuit 76 determining lines based on the image data is connected to the CPU 74 through buses⑥and⑦. A raster counter 78 is also connected thereto through buses④and⑤and a raster sensor 79 is connected thereto through a bus⑧.

An operation panel 80 (FIG. 19) is further connected to the CPU 74 of the printer engine. The panel 80 comprises a mode switching switch 81, a cassette selecting switch 82, LEDs 83 and 84 indicative of the state of selection of the developing units and so on.

Figure 9:
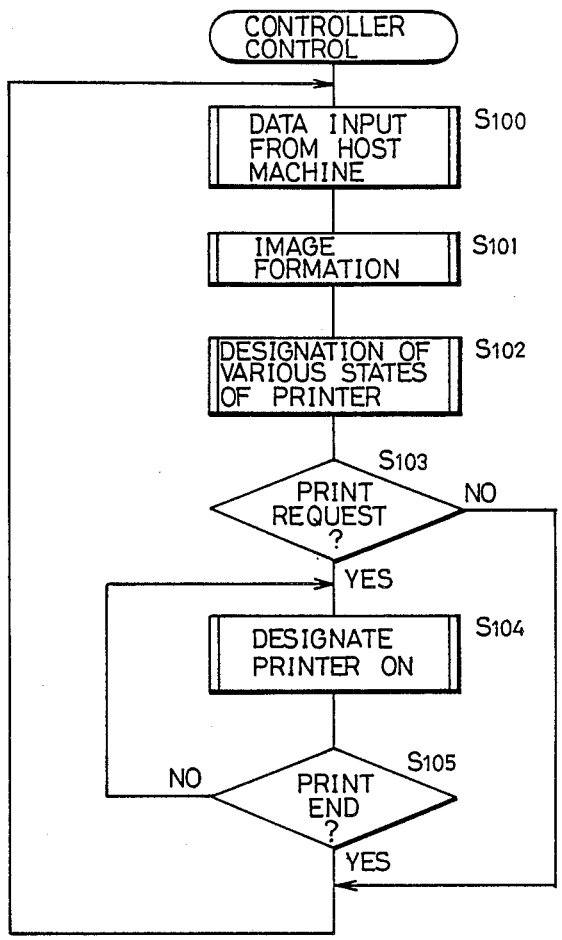
FIG. 9 is a flow chart showing a main routine of control of a controller shown in FIG. 8.

FIG. 9 is a flow chart showing a main routine of the control of the controller 72. A data input routine is carried out in the step S100, where the image data and the control data for the printer from the host machine 71 are inputted. In the step S101, an image forming routine is carried out, in which the image data are inputted to an image buffer. In the step S102, a routine for designating various states of the printer is carried out, in which the control data for the printer received from the host machine 71 are processed. The control data comprises data for selective switching of the initial developing units, designating the edition printing, the data in association with the switching timing of the developing units to provide the edition printing, the instructing data for selecting the paper feed inlets, setting various function modes, and so on. This routine will be described in detail later. In the step S103, whether there is a print request from the host machine or not is determined, and if there is a request, a command for actually activating the printer is outputted, so that the control enters a print routine (S104).

Once started, normally the print routine is maintained until the end of printing and the flow returns to the ordinary loop at the end of printing (S105).

Figure 10:
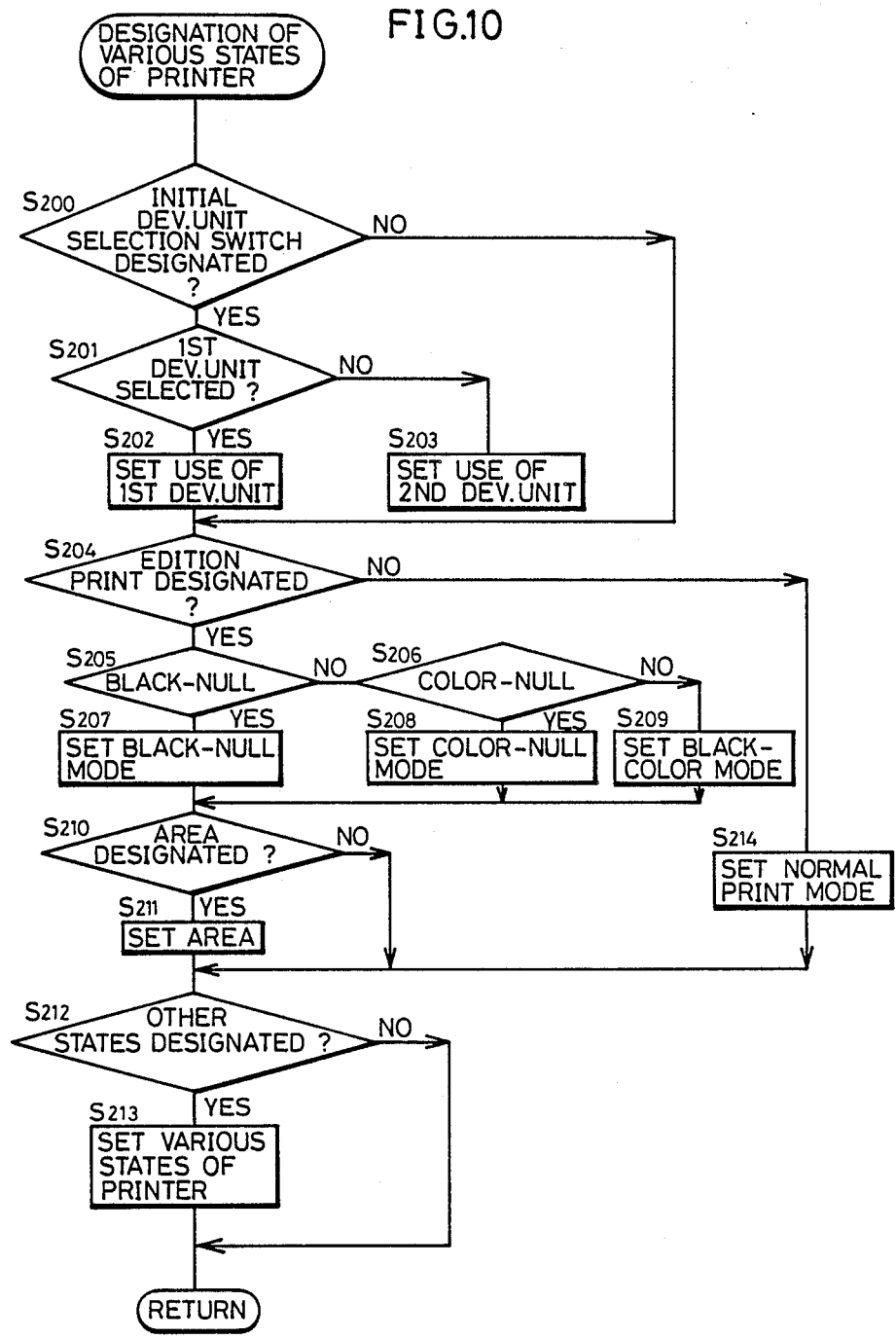
FIG. 10 is a flow chart showing a routine for designating various states of the printer shown in FIG. 9.

FIG. 10 is a flow chart showing the routine for designating various states of the printer of FIG. 9 (S102).

First, in the step S200, whether the switching of selection of the initial developing unit is designated or not is checked. If the switching of selection is designated, then whether or not the first developing unit is selected is checked in the step S201. If the first developing unit has been selected, then the first developing unit is set to be used (S202). If not, the second developing unit is set to be used (S203). Thereafter, in the step S204, whether the edition printing is designated or not is checked. If it is not designated (NO in the step S204), then the normal print mode is set (S214). When the edition printing is designated (YES in S204), then whether the black-null mode is designated or not is checked in the step S205. If the black-null mode is designated, then the black-null mode is set in the step S207. If the black-null mode is not designated, then whether the color-null mode is designated or not is checked in the step S206. If the color-null mode is designated, then the color-null mode is set in the step S208. If the color-null mode is not designated, then the black-color mode is set in the step S209. When the edition printing has been designated, then whether the area is designated or not is determined in the step S210. If the area is designated, then the area designating data is set in the step S211. Thereafter, other designations for the states of the printer are checked in the step S212, and the various states are set for the printer in accordance with the designation (S213). The various states of the printer may be set by setting data in an RAM area which can be commonly accessed for the printer and for the printer engine, or they may be set by updating data as needed by serial communication.

Figure 11C:
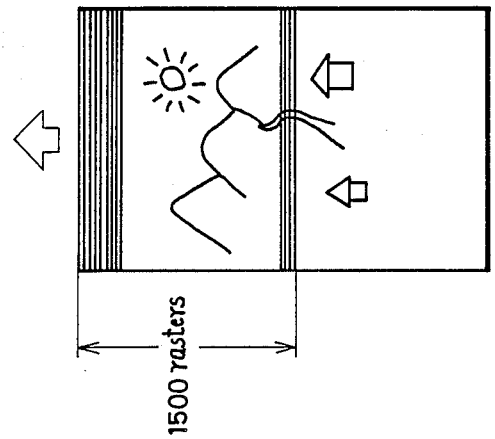
FIGS. 11A to 11C show a method for processing data when the developing units are to be switched at a position spaced by 100 mm from the edge of a sheet.
Figure 11B:
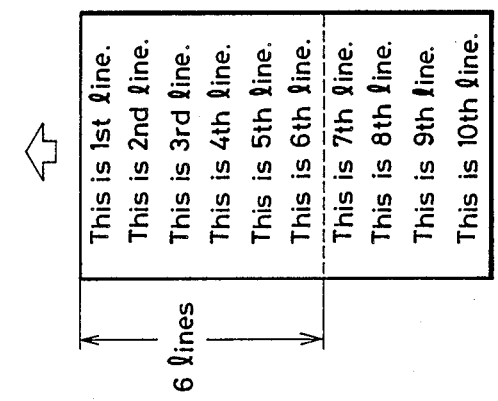
Figure 11A:
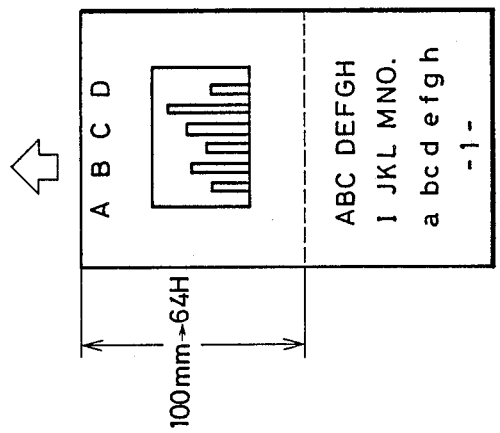

The setting of the area designating data is carried out in the following manner. Namely, the distance from the leading edge of a sheet of paper is represented by the unit of "mm", which is converted into hexadecimal data suitable for the interface of the printer engine as the state designating data to the printer. For example, when the developing units must be changed at a position spaced by 100 mm from the leading edge of the sheet of paper as shown in FIG. 11A, then the hexadecimal data of 64H is treated as the printer state designating data. The number of lines from the leading edge of the sheet or the raster number may be used for setting the area designating data, as shown in FIGS. 11B and 11C.

Figure 12:
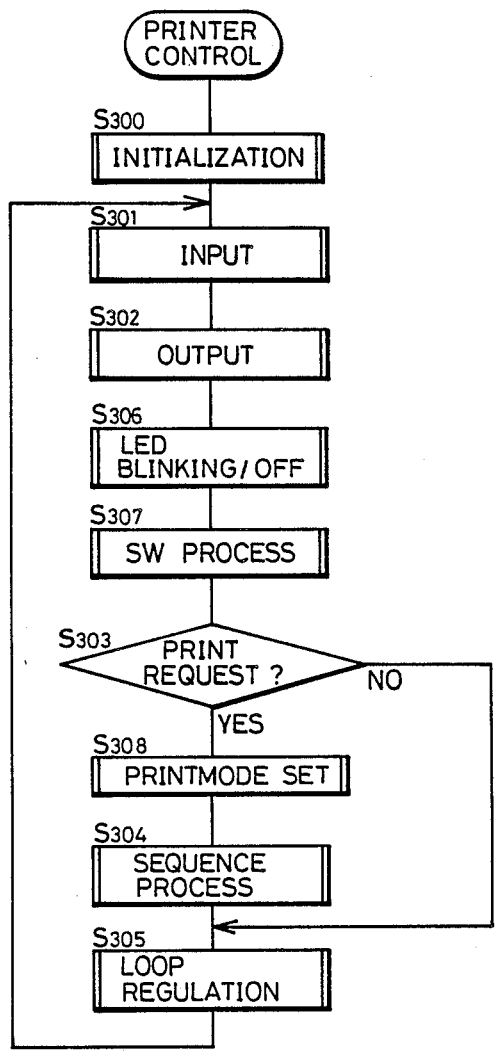
FIG. 12 is a flow chart of a main routine for controlling the printer engine of the CPU 74 shown in Fig. 8.

FIG. 12 shows a flow of a main routine of the CPU 74 for controlling the printer engine. First, in the step S300, the printer engine is initialized. Then, the flow enters a main loop. The input processing routine and the output processing routine are carried out in the steps S301 and 302, respectively. Data for turning on/off respective LEDs on the operation panel 80 are set in the step S306. The process for operating the mode switching switch 81 on the panel is carried out in the step S307. In the step S303, the presence/absence of a print command from the controller is checked. If there is the print command, then the flow proceeds to the step S308 to process the print mode setting request from the host 71. Then, in the step S304 a sequence processing routine is carried out, a loop regulating (for example regulating the loop time) routine is carried out in the step S305, and the flow returns to the input processing routine of the step S301. If there is no print command (NO in S303), then the loop regulating routine of the step S305 is carried out and the flow returns to the input processing routine of the step S301.

Figure 13:
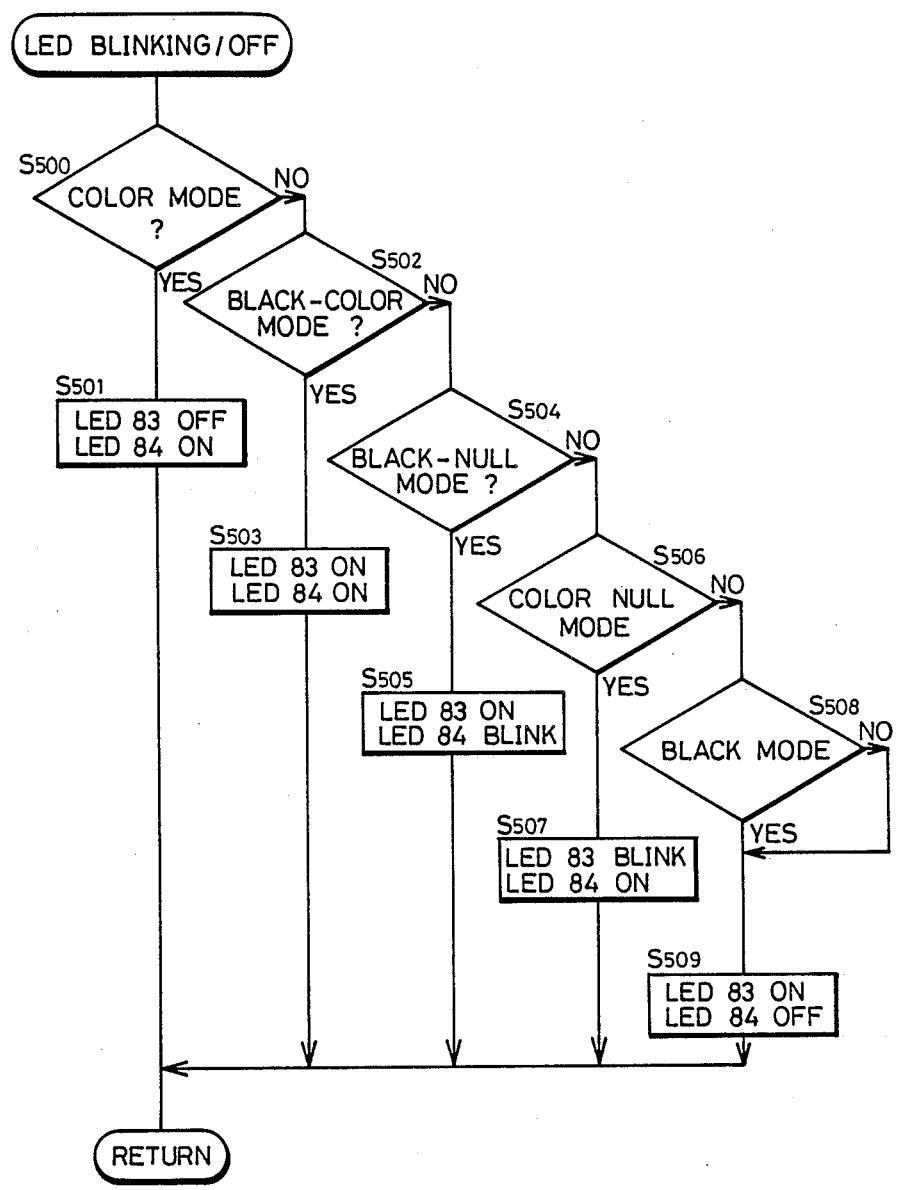
FIG. 13 is a flow chart showing the contents of LED blinking/turning off routine in FIG. 12.

FIG. 13 shows a flow of the LED blinking/turning off routine of FIG. 12. In this routine, the setting of data for turning on/off and blinking the LEDs for respective modes designated by switches on the operation panel or designated by the host or the controller.

First, in the step S500, whether or not the color mode is designated is determined. If the color mode is designated, the data are set such that the LED 83 at a position indicating "BLACK" on the operation panel 80 is turned off and the LED 84 at the position indicating "COLOR" is turned on, in the step S501. If the color mode is not designated (NO in S500) then whether the black-color mode is designated or not is checked in the step S502. If the black-color mode is designated, then the data are set in the step S503 so that the LEDs 83 and 84 are turned on. If the black-color mode is not designated (NO in S502), then whether the black-null mode is designated or not is determined in the step S504. If the black-null mode is designated, the data are set so that the LED 83 is turned on and the LED 84 is blinked. If the black-null mode is not designated (NO in S504), then whether the color-null mode is designated or not is checked in the step S506. If the color-null mode is designated, then the data are set so that the LED 83 is blinked and the LED 84 is turned on in the step S507. If the color-null mode is not designated, then whether the black mode is designated or not is checked in the step S508. In the step S509, data are set to turn on the LED 83 and to turn off the LED 84, regardless of the presence/absence of the designation.

Figure 14:
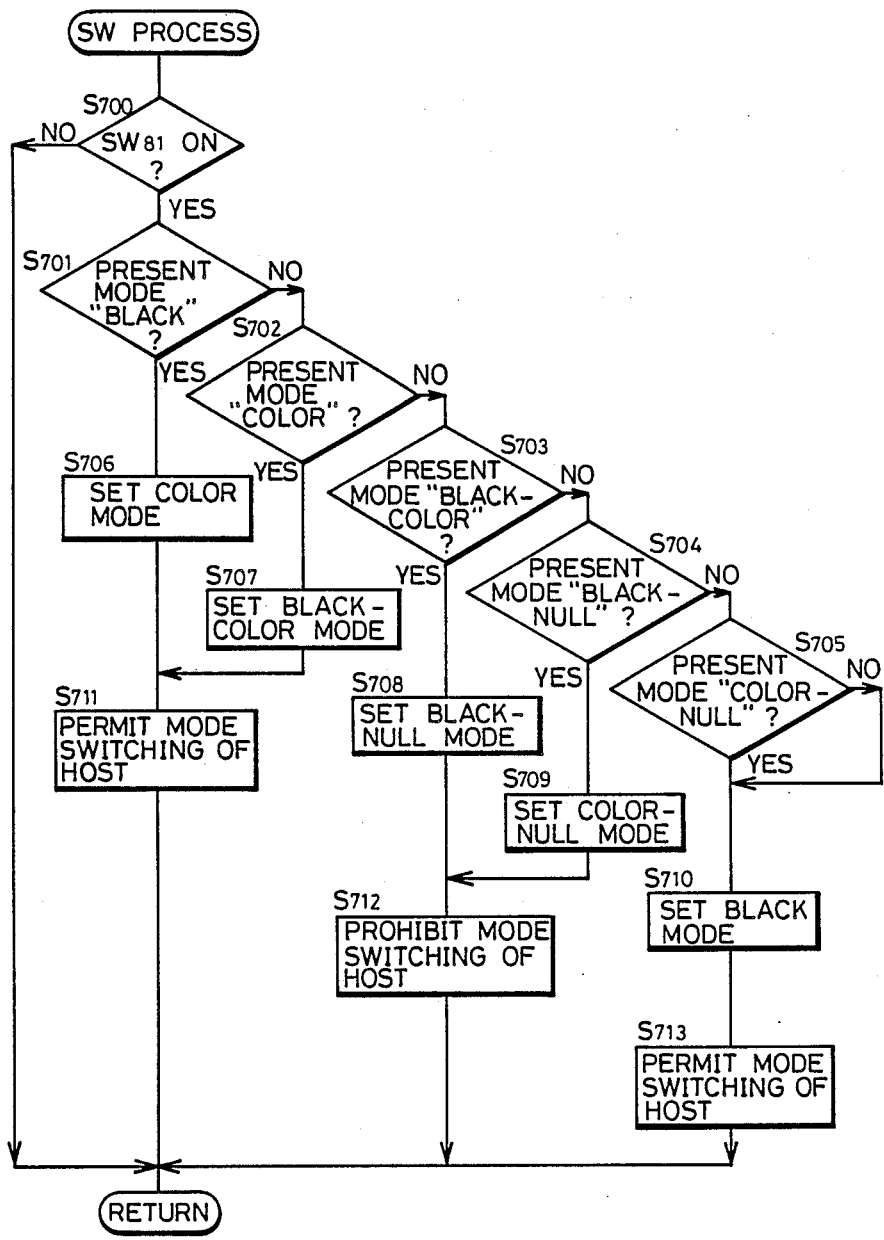
FIG. 14 is a flow chart of a switch processing routine of FIG. 12.
Figure 19:
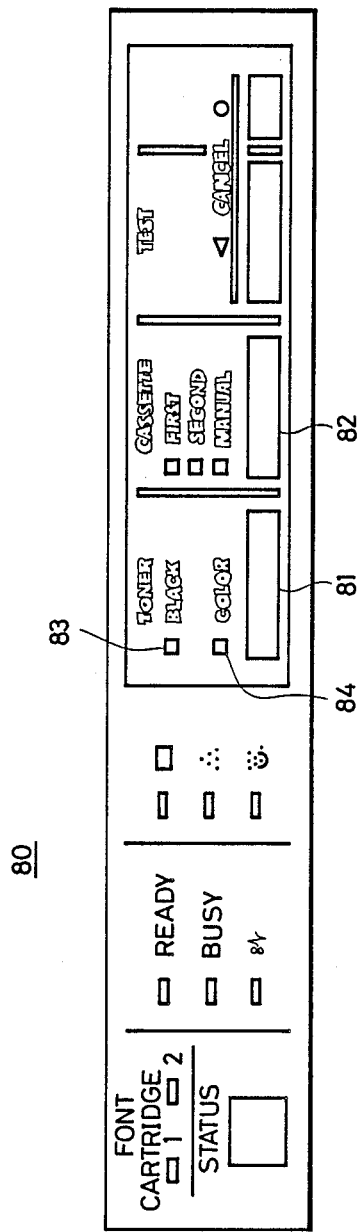
FIG. 19 is a plan view of an operation panel provided on the printer apparatus of FIG. 2.

FIG. 14 shows a SW processing routine of FIG. 12 in which switching•setting of the print mode is carried out by the mode switching switch 81. Description of other switching processes shown in FIG. 19 is omitted.

Figure 20:
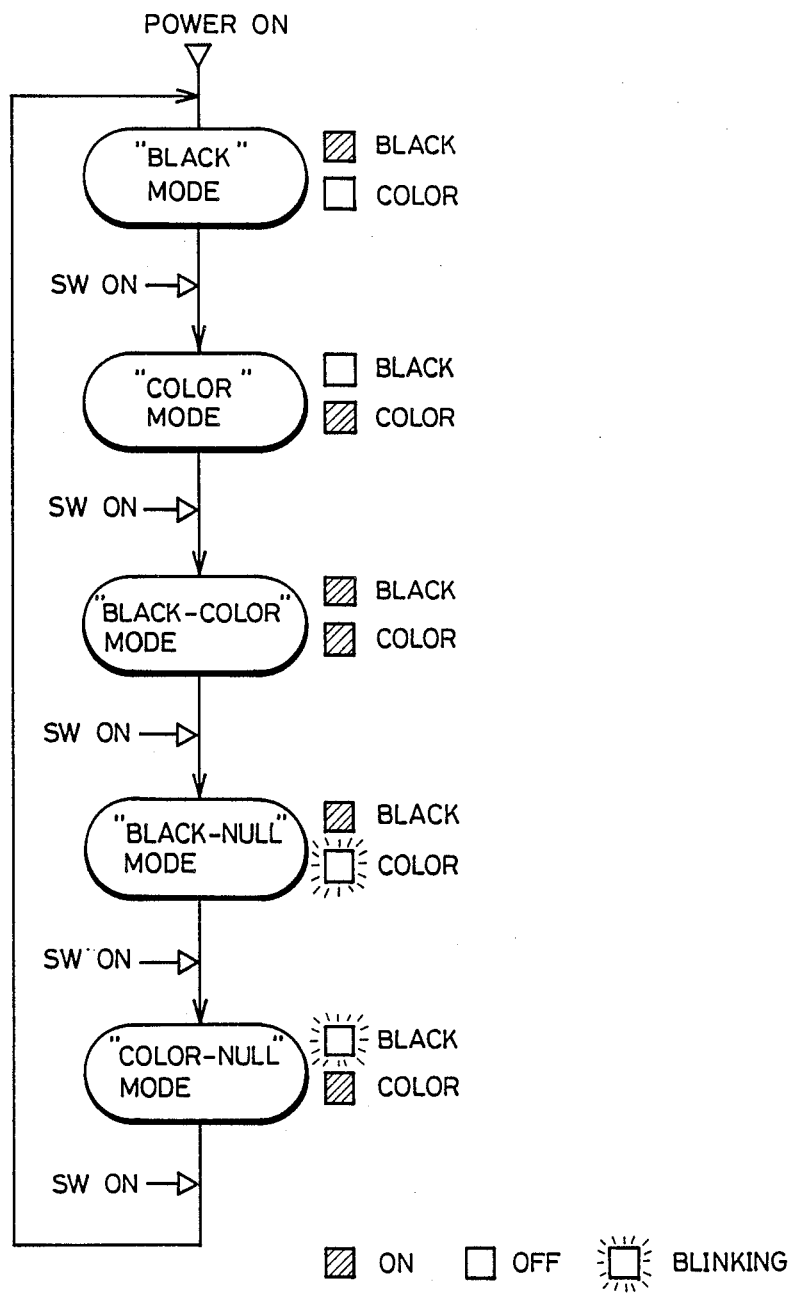
FIG. 20 show a change of modes by switching in accordance with one embodiment of the present invention.
Figure 21:
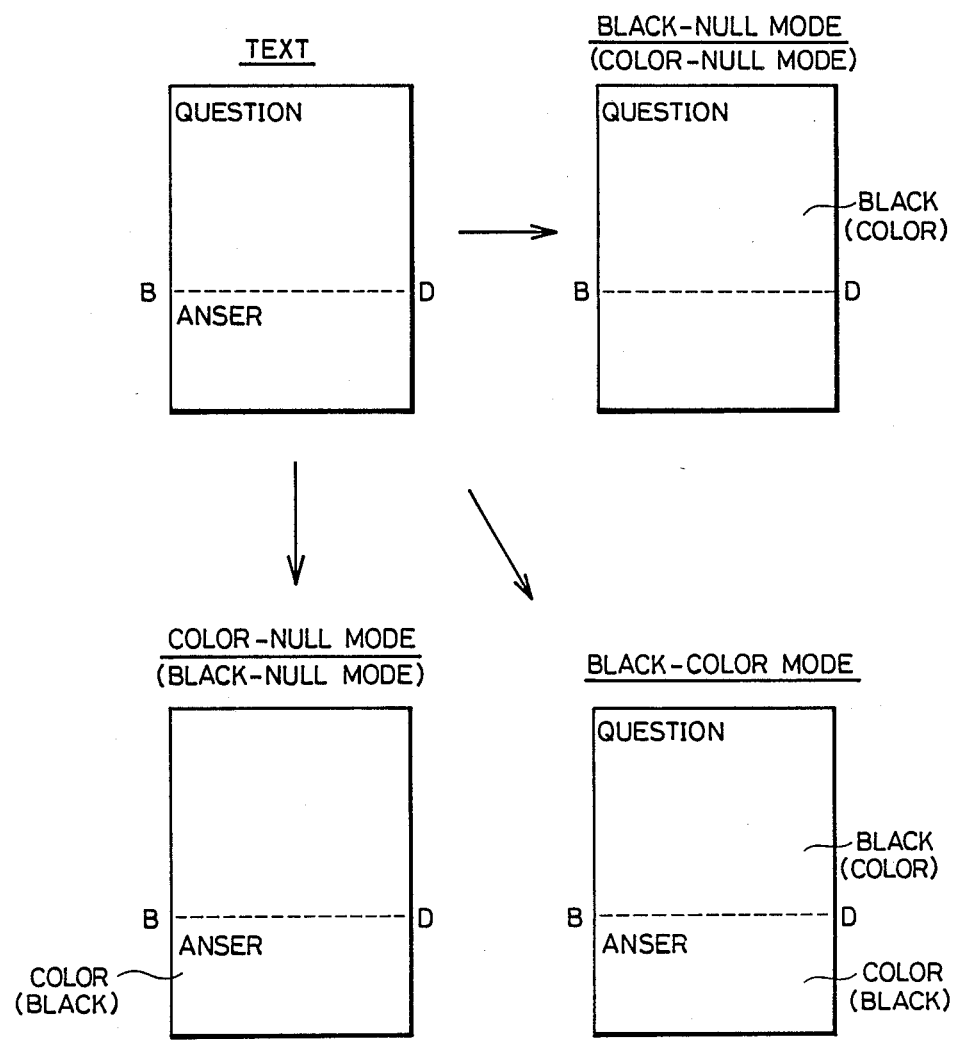
FIG. 21 shows image outputs in respective modes corresponding to the image data of the text in accordance with one embodiment of the present invention.

First, whether the switching switch 81 is turned ON or not is determined in the step S700. If the switch is not on, the process is terminated, and if the switch is on, then which of the modes the operation is in at present is determined in the following steps S701 to S705. If the current mode is the black mode (YES in S701), then the mode is changed to the color mode (S706). If the present mode is the color mode (YES in S702), then the mode is changed to the black-color mode (S707). Then the designation of mode switching of the host is permitted in the step S710. If the current mode is the black-color mode (YES in S703), then the mode is changed to black-null mode (S708). If the present mode is the black-null mode (YES in S704), then the mode is changed to the color-null mode (S709). The designation of mode switching by the host is prohibited in the step S712. If the present mode is the color-null mode (YES in S705), then the mode is changed to the black mode (S710), and then the mode switching by the host is permitted (S713). The mode switching based on the control data from the host is prohibited in the step S712, since the designation of the black-null, color-null mode by the switch input on the side of the printer is to be given priority to the mode designation from the host. FIG. 20 shows transition of the mode (by the switch 81) and the state of LEDs 83 and 84 in respective modes on the operation panel 80. As shown in the figure, the designation is changed from the black mode to the color-null mode every time the switch 81 is turned on and the rotation of the designated mode is carried out thereafter.

Figure 15:
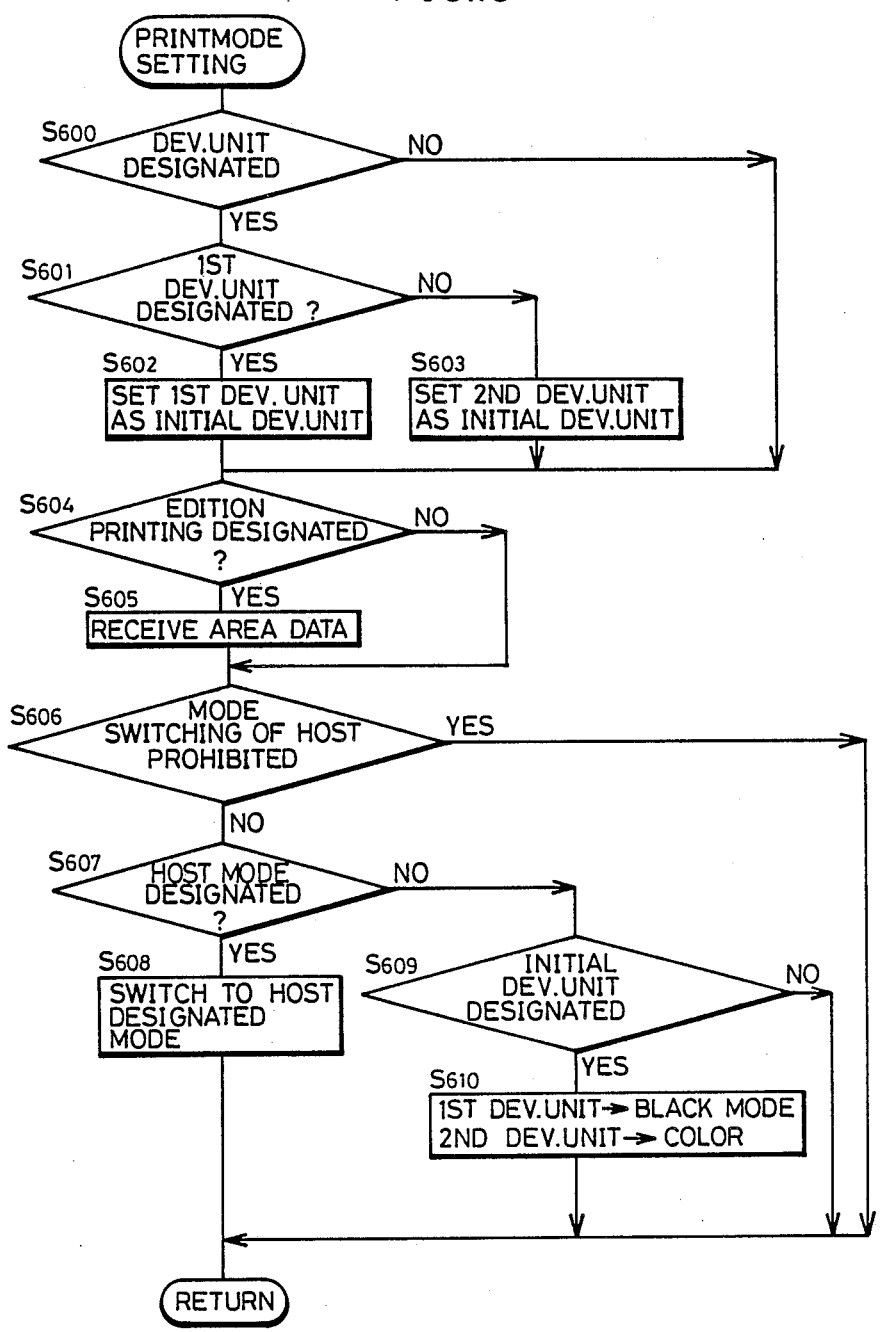
FIG. 15 is a flow chart of a print mode setting routine of FIG. 12.

FIG. 15 shows the print mode setting routine of FIG. 12.

In the print mode routine, a process for determining the final mode of the printer in accordance with the priority of the setting from the operation panel and the setting from the host. It should be noted that when the setting from the operation panel is the black-null mode or the color-null mode, the setting of the operation panel is given priority.

First, in the step S600, whether the initial developing unit is designated by the host or not is determined. If it is designated, then whether the designated developing unit is the first one or not is determined in the step S601. If the first developing unit is designated, then the first developing unit is set as the initial developing unit in the step S602. If the first developing unit is not designated, then the second developing unit is set as the initial developing unit in the step S603.

In the step S604, whether the edition printing (black-color, color-null, black-null) is designated or not is checked. If the edition printing is designated, then the area data are inputted in the step S605. In the step S606, whether the switching of the mode from the host is prohibited or not is determined. If the switching is not prohibited, then whether the mode is designated from the host or not is determined in the step S607. If the mode is designated, then the mode designated from the host is set. If the mode is not designated, then whether the initial developing unit is designated or not is checked in the step S609. When the initial developing unit is designated, the black mode is set if the initial developing unit is the first developing unit, and the color mode is set if the initial developing unit is the second developing unit, in the step S610.

Figure 16:
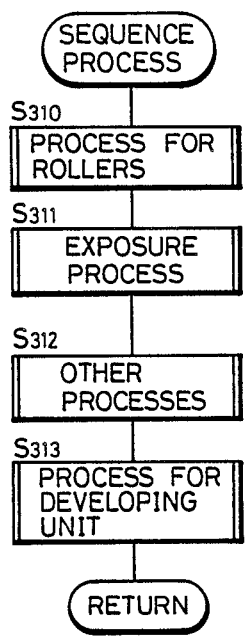
FIG. 16 is a flow chart of a sequence processing routine of FIG. 12.

FIG. 16 shows the content of the sequence processing routine of FIG. 12 (S304).

A roller processing routine is carried out in the step S310 in which the paper feeding and discharging rollers are controlled to feed and discharge sheets of paper. In the step S311, an exposure processing routine is carried out in which the on/off state if the laser is controlled. Other process routines are carried out in the step S312, in which a process for treating an accident and the like is carried out. Thereafter, a developing unit processing routine is carried out in the step S313 in which the switching of the developing unit in the edition printing mode is controlled.

The setting and control of the timing for switching the developing units in the edition print mode is carried out in the exposure processing routine (S311) and the actual switching is carried out in the developing unit processing routine (S313).

Figure 17:
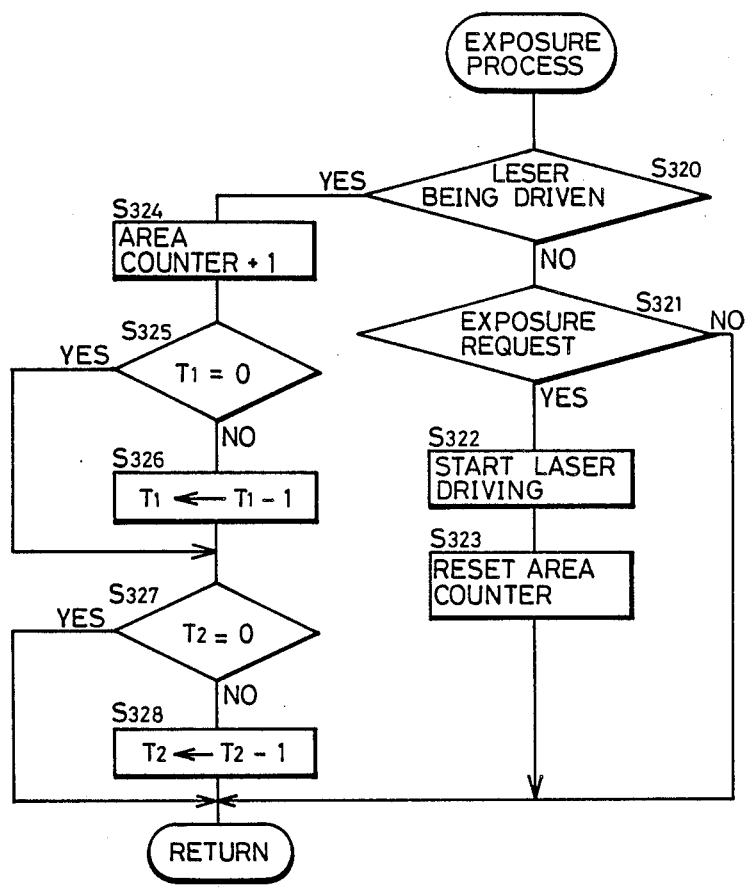
FIG. 17 is a flow chart of an exposure processing routine of FIG. 16.

FIG. 17 is a flow chart showing the contents of the exposure processing routine of FIG. 16.

The printer engine 73 which received the print command from the controller 72 checks whether the laser is being driven or not in the step S320. Since the laser is not being driven initially, the presence/absence of a request for exposure is checked in the step S321. If there is the request for exposure, the laser is driven (S322), and a print area counter is reset (S323). When the flow returns to the sequence processing loop after one circulation of the main loop, the flow proceeds to the step S324, since the laser is being driven. The print area counter is incremented (S324) and whether the timer counters T1 and T2 are set at zero or not is checked in the steps S325 and S327. If the timer counters T1 and T2 are not zero, then the counters T1 and T2 are decremented (S326 and S328). The increment of the print area counter shows that the exposure is carried out for a time period corresponding to the time required for one circulation of the main loop after the start of the laser exposure. The timer counters T1 and T2 are to control the timing for switching the developing units.

Figure 18A:
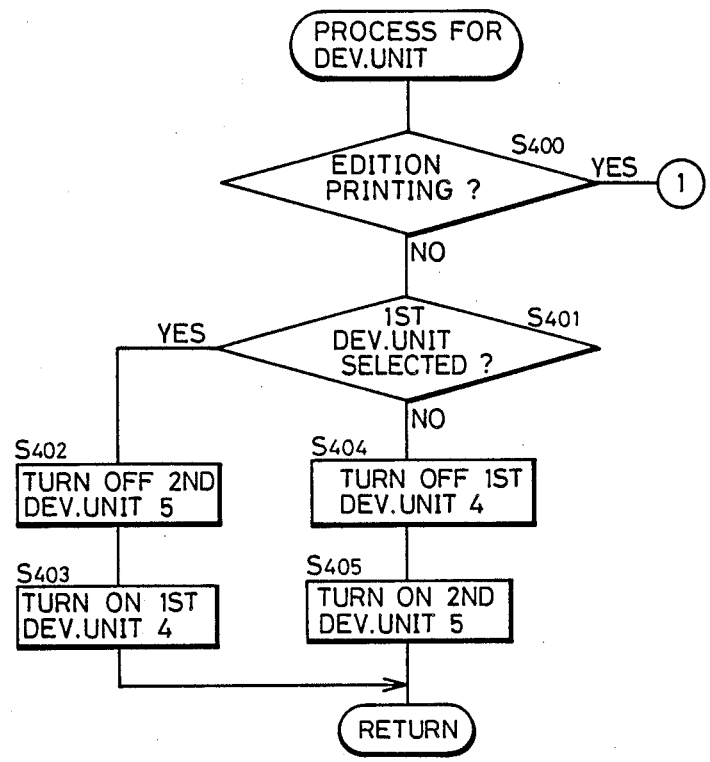
FIGS. 18A to 18C are flow charts showing the contents of the developing unit processing routine of FIG. 16.
Figure 18B:
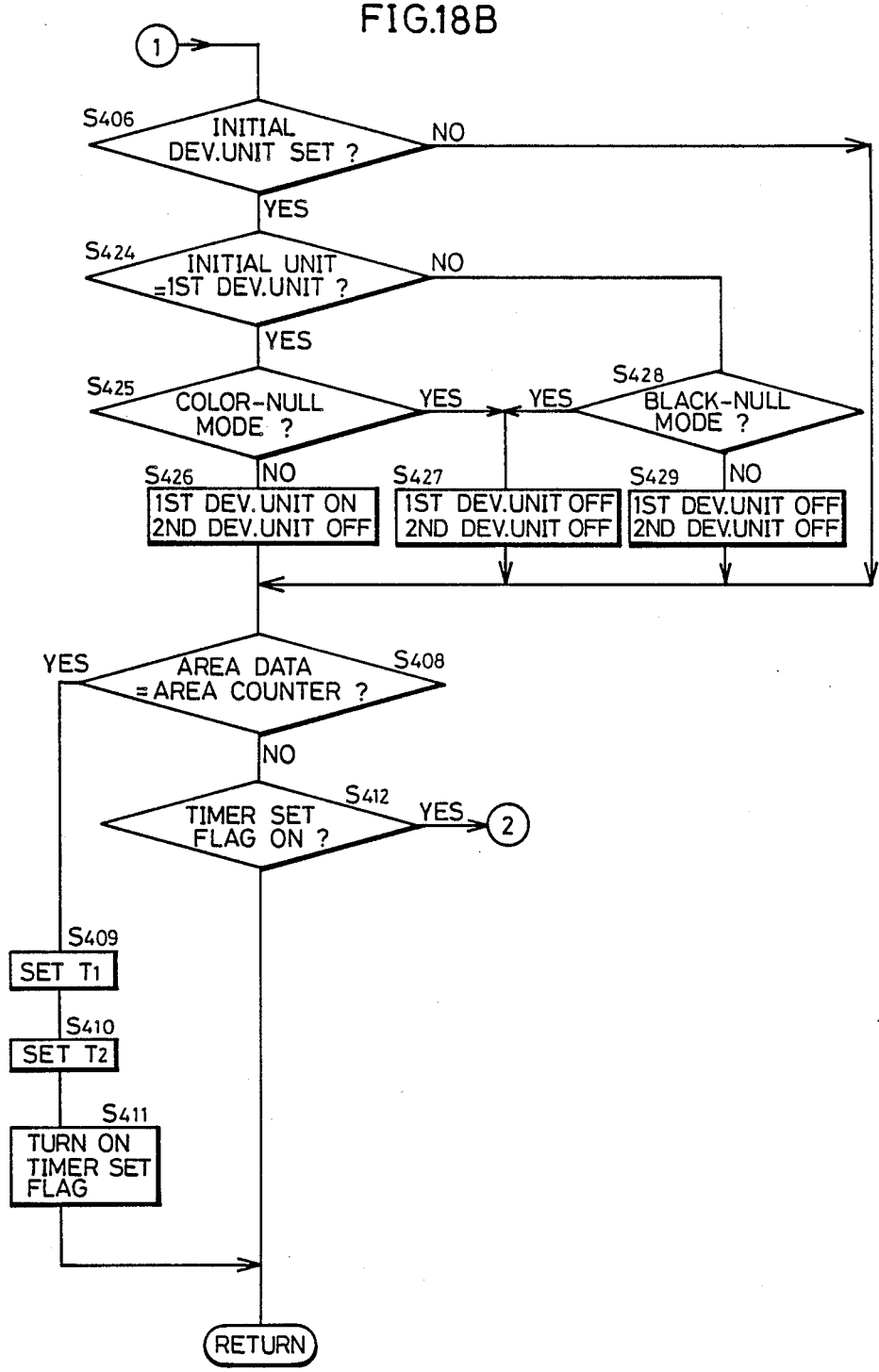
Figure 18C:
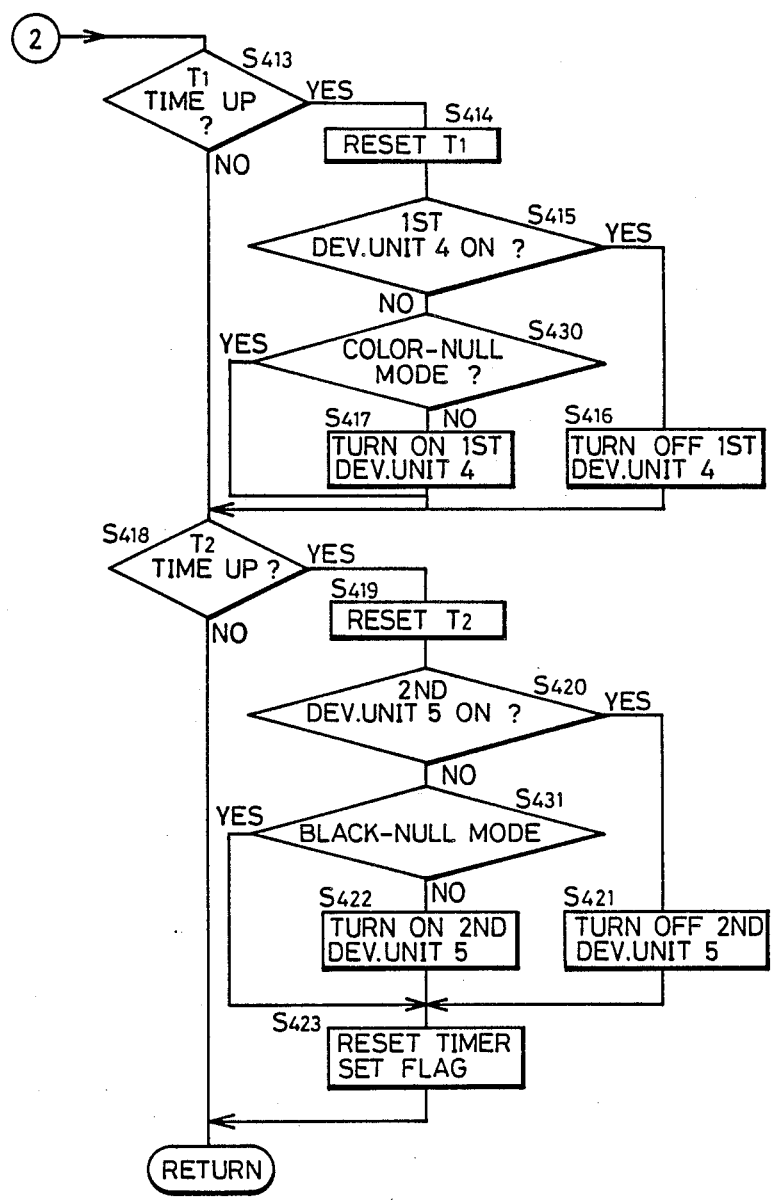

FIGS. 18A to 18C are flow charts showing the details of the developing unit processing routine of FIG. 16 (S313).

First, in the step S400, whether the operation is in the edition printing mode or not is checked. If it is in the normal print mode and not in the edition printing mode, then only one of the two developing units is driven in accordance with the processes from the steps S401 to S405 to print images of 1 page in one color. Namely, if the first developing unit is selected in the step S401, then the second developing unit is turned OFF (S402) and the first developing unit is turned on (S403). If the second developing unit is selected, then the first developing unit is turned OFF (S404) and the second developing unit is turned ON (S405). The first developing unit contains a developer of black and the second developing unit 5 contains a developer of a different color.

If it is determined that the operation is in the edition print mode in the step S400, then the flow proceeds to the step S406 in which whether the initial developing unit for the edition print mode is set or not is checked. If the initial developing unit is set, then whether the initial developing unit is the first developing unit or not is checked in the step S424. If the initial developing unit is the first developing unit, then whether it is in the color-null mode or not is determined in the step S425. If it is in the color-null mode, then the first and second developing units are both turned OFF in the step S427. If it is not in the color-null mode, then the first developing unit is turned on and the second developing unit is turned OFF in the step S426. If the initially set unit is not the first developing unit (NO in S424) then whether it is in the black-null mode or not is determined in the step S428. If it is in the black-null mode, then the first and second developing units are both turned OFF in the step S427. If it is in the black-null mode, then the first developing unit is turned off and the second developing unit is turned ON in the step S429.

Thereafter, whether the edition print area data applied from the controller 72 matches the content of the area counter which is incremented in the exposure processing routine of the sequence processing routine or not is determined in the step S408. If they match with each other, then the flow proceeds to the steps S409 and S410 in which timer counters T1 and T2 are set and a timer set flag is turned ON (S411).

Now, the values set in the timer counters T1 and T2 will be described. A value corresponding to a time period $t_1$ required for an exposure point on a photoreceptor to reach a developing position on the first developing unit 4 is set in the timer counter T1. A value corresponding to a time period $t_2$ required for the exposure point to reach the developing position of the second developing unit 5 is set in the timer counter T2.

Figure 2:
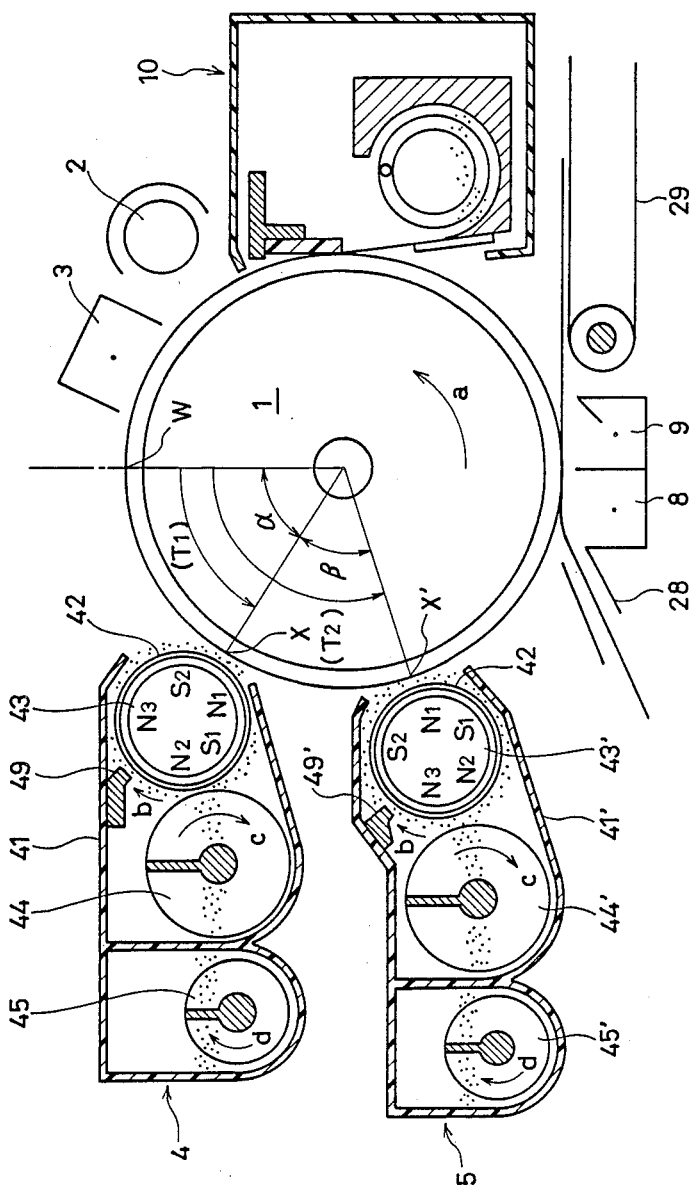
FIG. 2 is an enlarged cross sectional view showing an arrangement of developing units and the like around a photoreceptor drum of FIG. 1.

More specifically, the time period in which the exposure point W on the photoreceptor drum 1 reaches the point X in FIG. 2 is represented as $t_1$, and a time period in which the point W reaches the point X' is represented as $t_2$. The time periods $t_1$ and $t_2$ can be calculated in accordance with the following equations $t_1 = J/V$ sec.

$t_2 = K/V$ sec.

where the peripheral length from the exposure point W to the developing position X of the first developing unit is represented as J mm and the peripheral length from the exposure point W to the developing position X' of the second developing unit 5 is represented by K mm.

The timer counters are used for measuring a time lag between the times from the exposure point W to the developing points X and X' and the timer counters t1 and t2 are set when the print area data matches the area counter representing the currently exposed position to start the time measuring operation.

When the print area data does not coincide with the contents of the area counter (YES in S408), then whether the timer flag is ON or not is checked in the step S412. If the timer set flag is not ON, this routine is terminated. If the timer set flag is ON (YES in S412), then the end of operation of the timer counters t1 and t2 are checked in the steps S413 and S418. If the end of the time of the timer counter T1 is recognized in the step S413, then the said timer counter T1 is reset and whether the first developing unit 4 is ON or not is determined in the step S415. If the first developing unit 4 is ON and is operating (YES in S415), then the first developing unit 4 is turned off (S416). If the first developing unit is OFF, then whether it is in the color-null mode or not is determined in the step S430. If it is not in the color null-mode, the first developing unit 4 is turned on and therefore the developing unit is switched to the first developing unit 4 (S417). If the end of the time of the timer counter T2 is recognized in the step S418, then the said timer counter T2 is reset (S419), and whether the second developing unit 5 is turned on or not is checked in the step S420. If the second developing unit 5 is turned on and is operating, then the second developing unit 5 is turned off (S421). If the second developing unit is turned off, then whether it is in the black-null mode or not is determined in the step S431. If it is not in the black-null mode, then the second developing unit 5 is turned on and the developing unit is switched to the second developing unit 5 (S422), and the timer set flag is reset (S423).

Although edition printing is realized by selectively switching and driving two developing units in the above described embodiment, the edition printing can be realized by selectively switching and driving three or more developing units.

Although means for prohibiting development by a developing unit of a specified color is disclosed in the foregoing, means for prohibiting print output of the images of a specified color comprises turning OFF of the laser exposure or turning OFF in the stage of charging for the memory data in association with the specified color.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording system comprising a host control unit for generating image data and a printer apparatus for forming an image on a sheet of paper in accordance with the image data generated from said host control unit, wherein
   said printer apparatus having a function of dividing the image into at least two image areas with respect to a boundary and of forming each of said image areas in different colors,
   said host control unit adapted to apply to said printer apparatus a boundary signal indicative of the boundary of at least two image areas which are to be formed in different colors,
   said printer apparatus comprising
   designating means for designating one of said image areas as an image to be formed, and
   prohibiting means for prohibiting formation of the image area other than the image area designated by said designating means.

2. An image recording system according to claim 1, wherein
   said printer apparatus further includes
   a photoreceptor on which a latent electrostatic image is formed, and
   image forming means for forming the latent electrostatic image on said photoreceptor; and
   prohibiting means prohibits formation of the latent electrostatic image by said image forming means corresponding to the image area other than the image area designated by said designating means.

3. An image recording system according to claim 1, wherein
   said printer apparatus further comprises
   image forming means for forming a latent electrostatic image, and
   developing means for developing the latent electrostatic image formed by said image forming means; and
   said prohibiting means prohibits development of the latent electrostatic image by said developing means corresponding to the image area other than the image area designated by said designating means.

4. An image recording system comprising a host control unit for generating image data and a printer apparatus for forming an image on a sheet of paper in accordance with the image data generated from said host control unit,
   said host control unit adapted to supply to said printer apparatus a boundary signal indicative of a boundary of two image areas which are to be formed with different colors,
   said printer apparatus comprising
   a photoreceptor on which a latent electrostatic image is formed,
   image forming means for forming latent electrostatic image of 1 page on said photoreceptor,
   a plurality of developing means for developing the latent electrostatic image formed on said photoreceptor and for turning the same to a toner image with toners of different colors,
   transfer means for transferring the toner image on said photoreceptor onto the sheet of paper,
   control means responsive to said boundary signal from said host control unit for controlling said plurality of developing means such that the development of the latent electrostatic image of 1 page by one developing means is switched to development by another developing means, whereby the latent electrostatic image formed on said photoreceptor is divided into two image areas with respect to the boundary corresponding to said boundary signal, each of said image areas developed by toners of different colors,
   designating means for designating a specified toner color, and
   prohibiting means for prohibiting operation of those of said developing means which employ toner of color other than the specified color designated by said designating means.

5. An image recording system according to claim 4, wherein
   said designating means comprises an operation panel provided on said printer apparatus.

6. An image recording system comprising a host control unit for generating image data and a printer apparatus for forming an image on a sheet of paper according to the image data generated from said host control unit, said host control unit adapted to supply to said printer apparatus a boundary signal indicative of a boundary of two image areas, said apparatus comprising a photoreceptor on which a latent electrostatic image is formed, image forming means for forming a latent electrostatic image of 1 page on said photoreceptor, a plurality of developing means for developing the latent electrostatic image formed on said photoreceptor and turning the same to a toner image with toners of different colors, transfer means for transferring the toner image on said photoreceptor onto the sheet of paper, mode selecting means for selecting a desired mode out of first, second and third modes, and control means responsive to a selecting output of said first mode by said mode selecting means for controlling said developing means such that any one of such developing means develops the latent electrostatic image of 1 page formed by said image forming means, responsive to a selecting output of said second mode by said mode selecting means for controlling said means such that the development by one developing means is switched to the development of by another developing means in response to said boundary signal, whereby the latent electrostatic image of said 1 page is divided into two image areas with respect to the boundary, each of said image areas developed with toners of different colors, and responsive to a selecting output of said third mode by said mode selecting means for controlling said developing means such that one of said image areas divided with respect to the boundary is developed by any one of said developing means.

7. An image recording system according to claim 6, wherein said mode selecting means comprises an operation panel provided on said printer apparatus.

* * * * *